US009489548B2

(12) United States Patent
Lo et al.

(10) Patent No.: US 9,489,548 B2
(45) Date of Patent: *Nov. 8, 2016

(54) MAGNETIC STRIPE READER WITH CARD SWIPE INFORMATION FEEDBACK

(71) Applicant: BBPOS LIMITED, Hong Kong (HK)

(72) Inventors: Chi Wah Lo, Hong Kong (HK); Hwai Sian Tsai, Hong Kong (HK)

(73) Assignee: BBPOS LIMITED, Tsuen Wan (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/825,016

(22) Filed: Aug. 12, 2015

(65) Prior Publication Data

US 2015/0347790 A1    Dec. 3, 2015

Related U.S. Application Data

(63) Continuation of application No. 14/166,763, filed on Jan. 28, 2014, now Pat. No. 9,129,166.

(60) Provisional application No. 61/761,316, filed on Feb. 6, 2013.

(51) Int. Cl.
*G06K 7/08* (2006.01)
(52) U.S. Cl.
CPC ..................................... *G06K 7/084* (2013.01)
(58) Field of Classification Search
CPC ................................................. H04M 2250/14
USPC .................................................. 235/493, 449
See application file for complete search history.

(56) References Cited

U.S. PATENT DOCUMENTS

| 7,163,148 | B2 * | 1/2007 | Durbin ................... | G06K 7/084 235/449 |
| 8,226,001 | B1 | 7/2012 | Foo et al. | |
| 8,231,055 | B2 | 7/2012 | Wen | |
| 8,534,555 | B1 * | 9/2013 | Sweet ................... | G06K 7/084 235/376 |
| 2003/0135470 | A1 | 7/2003 | Beard | |
| 2007/0139802 | A1 | 6/2007 | Kuribayashi et al. | |
| 2014/0070006 | A1 | 3/2014 | Weldele et al. | |

FOREIGN PATENT DOCUMENTS

JP        2004288253 A    10/2004

OTHER PUBLICATIONS

PCT: International Search Report and Written Opinion of the International Searching Authority of PCT/CN2014/071772 (related application), dated Apr. 30, 2014.

* cited by examiner

*Primary Examiner* — Seung Lee
(74) *Attorney, Agent, or Firm* — Howlson & Arnott, LLP

(57) ABSTRACT

A magnetic card reader module includes a magnetic sensor and an adjacent groove, a micro controller and an application. The magnetic sensor is configured to pick-up an analog magnetic signal generated by swiping a magnetic stripe through the groove. The magnetic stripe is attached to a card and comprises tracks with magnetically encoded data. The microcontroller is configured to convert the analog magnetic signal into a digital signal. The application is configured to analyze the digital signal, and to perform soft-decision decode of the digital signal and to generate an output comprising the magnetically encoded data and side information providing card swipe information feedback.

3 Claims, 5 Drawing Sheets

MAGNETIC STRIPE READER WITH CARD SWIPE INFORMATION FEEDBACK

CROSS-REFERENCE TO RELATED APPLICATIONS

This application is a Continuation of U.S. patent application Ser. No. 14/166,763, filed on Jan. 28, 2014, entitled MAGNETIC STRIPE READER WITH CARD SWIPE INFORMATION FEEDBACK, published on Aug. 7, 2014 as U.S. Publication No. 2014-0217174. U.S. application Ser. No. 14/166,763 claims benefit of U.S. Provisional Application No. 61/761,316, filed on Feb. 6, 2013, entitled MAGNETIC STRIPE READER WITH CARD SWIPE INFORMATION FEEDBACK. U.S. patent application Ser. No. 14/166,763 and 61/761,316, and U.S. Publication No. 2014-0217174 are incorporated by reference herein in their entirety.

TECHNICAL FIELD

The present invention relates to a system and a method for a magnetic stripe reader that provides card swipe information feedback.

BACKGROUND

Magnetic stripe cards are used for storing various types of data in the magnetic stripe. They find applications in different areas including payment cards, gift cards, security access control systems, identification system and toys, among others. A magnetic stripe card includes a plastic or paper card that has an attached magnetic stripe. Data are encoded magnetically on the magnetic stripe by modifying the magnetism of iron based ferromagnetic particles that are embedded in the magnetic stripe. There are usually three tracks of data encoded onto the magnetic stripe. The data can be retrieved by using magnetic card readers.

A magnetic card reader includes a magnetic read head and an adjacent card gliding groove. The magnetic read head includes a magnetic sensor, which in one example is a magnetic coil. A magnetic stripe of a magnetic card reader is swiped through the groove and the swiping motion generates an analog magnetic signal that is picked up by the magnetic sensor of the adjacent magnetic read head. The analog magnetic signal contains the magnetically encoded data of the magnetic stripe. The strength of the analog magnetic signal with the magnetically encoded data is usually weak, therefore the magnetic read head and the magnetic stripe need to be in close contact in order to obtain a "good" signal read. In manually operated magnetic card readers, the card gliding groove includes two opposing walls and the magnetic read head is placed on one of the walls, so that when the magnetic stripe of the magnetic card is placed inside the groove, the magnetic stripe on the card and the magnetic read head are aligned in position. The magnetic read head is usually housed in a metal compartment that also contains all the electronics inside. In most cases, the magnetic stripe can be read from both directions, that is, the magnetic card can be swiped starting from either end of the groove.

A magnetic stripe card is inexpensive compared to other card technologies and is easy to program. However, magnetic stripe technology is also susceptible to misreads, card wear, and data corruption. Therefore, in some cases, the magnetic card reader may be unable to read a magnetic card swipe successfully. There are many possible causes for this effect including, card swipe speed and uniformity, card alignment, degradation of the magnetically encoded data, and magnetic read head failure, among others.

When a magnetic card read fails, the user usually has to retry the card swipe. However, without any error feedback, the user has no way of knowing why the previous swipe failed and how to correct it. Therefore, a magnetic card reader with feedback information will be very useful in improving the success rate of a magnetic card read after a card read failure.

SUMMARY

The invention provides a new magnetic card reader module with card swipe information feedback. This feature improves greatly the user experience of a magnetic card reader and helps to diagnose the cause of a failed card read.

In general, in one aspect, the invention provides a magnetic card reader module including a magnetic sensor and an adjacent groove, a microcontroller and an application. The magnetic sensor is configured to pick-up an analog magnetic signal generated by swiping a magnetic stripe through the groove. The magnetic stripe is attached to a card and comprises tracks with magnetically encoded data. The micro controller is configured to convert the analog magnetic signal into a digital signal, and the application is configured to analyze the digital signal, and to perform soft-decision decode of the digital signal and to generate an output comprising the magnetically encoded data and side information providing card swipe information feedback.

Implementations of this aspect of the invention may include one or more of the following features. The magnetic card reader module further includes an amplifier and a rectification circuit and the analog magnetic signal is amplified by the amplifier and rectified by the rectification circuit, and thereby a train of square-shaped pulses is generated. The application comprises an edge detection decoding algorithm configured to determine the spacings between rising and/or falling edges of two consecutive rectified pulses. The determined spacings are used as soft decision parameters. Far apart spaced rising and/or falling edges of two consecutive rectified pulses indicate a fast magnetic stripe swipe. Rising and/or falling edges of two consecutive rectified pulses are spaced far apart when their spacing is comparable to or larger than their height. Closely spaced rising and/or falling edges of two consecutive rectified pulses indicate a slow magnetic stripe swipe. Rising and/or falling edges of two consecutive rectified pulses are closely spaced when their spacing is smaller than their height. The magnetic card reader module further includes an amplifier and an analog-to-digital converter (ADC). The analog magnetic signal is amplified by the amplifier and converted to a digital signal by the ADC. The application decodes the digital signal by determining positions of peaks in the digital signal, determining the spacing between consecutive peaks. The determined spacing is used as soft decision parameter. The microcontroller is further configured to determine the magnetic stripe swipe speed and to provide magnetic stripe swipe diagnostic information. The magnetic stripe swipe diagnostic information comprises a graphical plot of the magnetic stripe swipe speed versus time. The graphical plot of the magnetic stripe swipe speed versus time further comprises upper and lower swipe speed limits. The side information is further configured to be controlled via a software command or a hardware configuration. The side information is further configured to be controlled via an input pin. The magnetically encoded data further comprise an error detecting code. The error detecting code comprises a parity bit for each encoded character and the application is further configured to determine positions of parity error bits. The error detecting code further comprises a longitudinal parity bit for each track of data and the application is further configured to determine positions of longitudinal parity error bits.

In general, in another aspect, the invention provides a method for reading data encoded in a magnetic stripe including the following. Providing a magnetic card reader comprising a magnetic sensor and an adjacent groove. The magnetic sensor is configured to pick-up an analog magnetic signal generated by swiping a magnetic stripe through the groove. The magnetic stripe is attached to a card and comprises tracks with magnetically encoded data. Next, providing a micro controller configured to convert the analog magnetic signal into a digital signal. The micro controller is further configured to analyze the digital signal, and to perform soft-decision decode of the digital signal and to generate an output comprising the magnetically encoded data and side information providing card swipe information feedback.

DETAILED DESCRIPTION

As was mentioned above, in some cases, the magnetic card reader may be unable to read a magnetic card swipe successfully. There are many possible causes for this effect including, card swipe speed and uniformity, card alignment, degradation of the magnetically encoded data, and magnetic read head failure, among others.

In particular, the way and speed the card is swiped affects the success rate of a magnetic stripe read. A swipe that is too fast, too slow, or a swipe with a non-uniform speed or otherwise not smooth, usually causes a failed card read. Another possible cause is the degradation of the magnetically encoded data. Weak signal, data error, or a damaged track may make a data track unreadable. Another possible cause, of course, is the failure of the magnetic reader itself. A misalignment between the magnetic stripe and the magnetic reader is also a possible factor. This can be due to problems with the magnetic card, the magnetic reader or the swipe.

In most magnetic card reader modules, the track data output is a "hard decode" of the analog magnetic signal that is picked up by the magnetic read head. A "hard decode" or a "hard decision" or a "hard-decision decoder" refers to a decoding mechanism or a decoder that operates on data that take on a fixed set of possible values, i.e., 0 or 1 in a binary code. After the hard decision, any information about the magnetic card read is lost.

The raw magnetic signal, however, contains much more information that may be helpful in determining the cause of a failed magnetic read.

When a magnetic card read fails, the user usually has to retry the card swipe. However, without any error feedback, the user has no way of knowing why the previous swipe failed and how to correct it. Therefore, a magnetic card reader with feedback information will be very useful in improving the success rate of a magnetic card read after a card read failure. The card swipe information feedback would allow the user to adjust the card swipe speed or the way the card swipe is performed, to identify the possible causes of the failure or reduce the number of retries if the user knows that the card data are corrupted.

The present invention provides a new magnetic card reader module that provides card swipe information feedback, that is based on a "soft decode" mechanism or a "soft-decision decoder". A "soft decode, or "soft decision" or "soft-decision decoder" refers to a class of algorithms used to decode data that have been encoded with an error correcting code. In addition to the "hard-decision" data of a fixed set of possible values (i.e., 0 or 1 of a binary code), the inputs to a "soft-decision decoder" may take on a whole range of in-between values. This extra information indicates the reliability of each input data point, and is used to provide better values of the original data. Therefore, a soft-decision decoder typically performs better in the presence of corrupted data than the hard-decision decoder.

Figure 1:
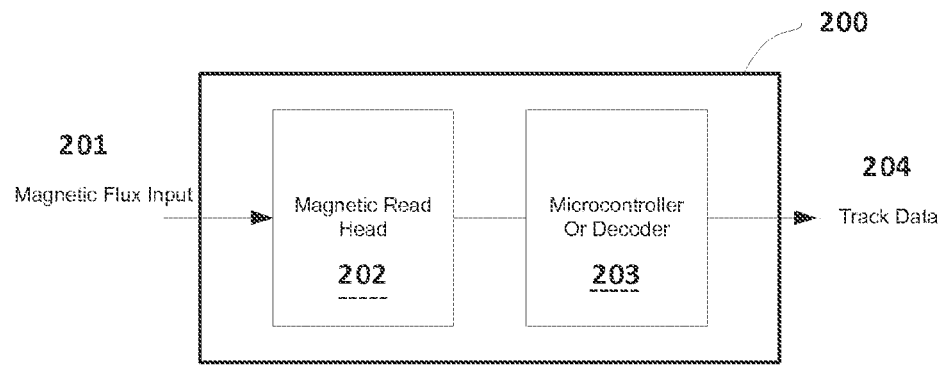
FIG. 1 shows a simplified block diagram of a magnetic read head module.

Referring to FIG. 1, a magnetic read head module 200 typically includes a magnetic read head 202 and a microcontroller or decoder 203. The magnetic read head 202 includes a magnetic sensor that picks up an analog magnetic flux 201 and converts the input magnetic flux signal 201 into an electronic signal. The analog magnetic flux 201 contains the magnetically encoded data of a magnetic stripe. The microcontroller or decoder circuit 203 converts the electronic signal back into the data encoded on the tracks of the magnetic stripe and outputs the digital track data 204 to be consumed by other circuits. The output data 204 are results of a "hard decision decoder" and have a fixed set of possible values, i.e., 0 or 1 in a binary code. Therefore, when a card read fails, there is no feedback indicating why the card read swipe failed.

Figure 2:
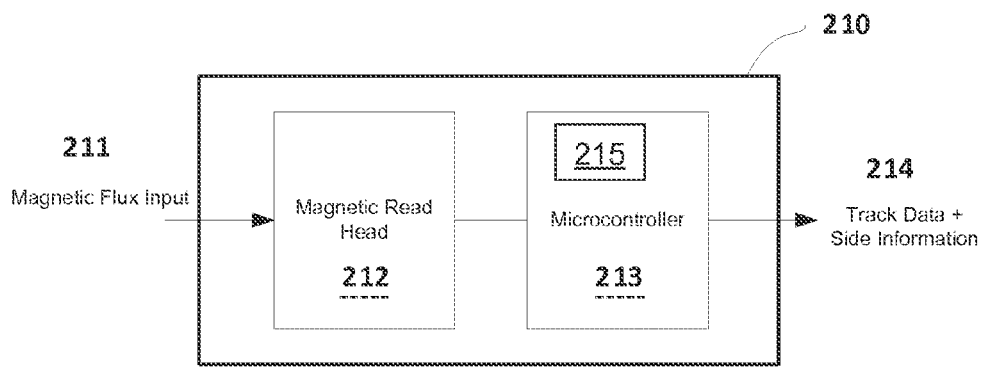
FIG. 2 shows a simplified block diagram of a magnetic read head module of the present invention.

Referring to FIG. 2, the magnetic read head module 210 of the present invention includes a magnetic read head 212, a microcontroller 213 and an application 215. The magnetic read head 212 includes a magnetic sensor that picks up an analog magnetic flux signal 211 and converts the magnetic flux signal 211 into an electronic signal. The microcontroller 213 and application 215 process the electronic signal to extract values based on a "soft decision decoder" mechanism. The microcontroller 213 outputs card swipe information (or side information) 214 based on the analysis performed by the "soft decision decoder" mechanism. If the card read is successful, the track data of the magnetic stripe will be generated as an output. If an error occurs during the card read, the side information 214 will help the user to determine the possible cause of the failed read. In this way, the user can either adjust the card swipe speed accordingly or identify a possible bad card when the data are not readable.

Figure 3:
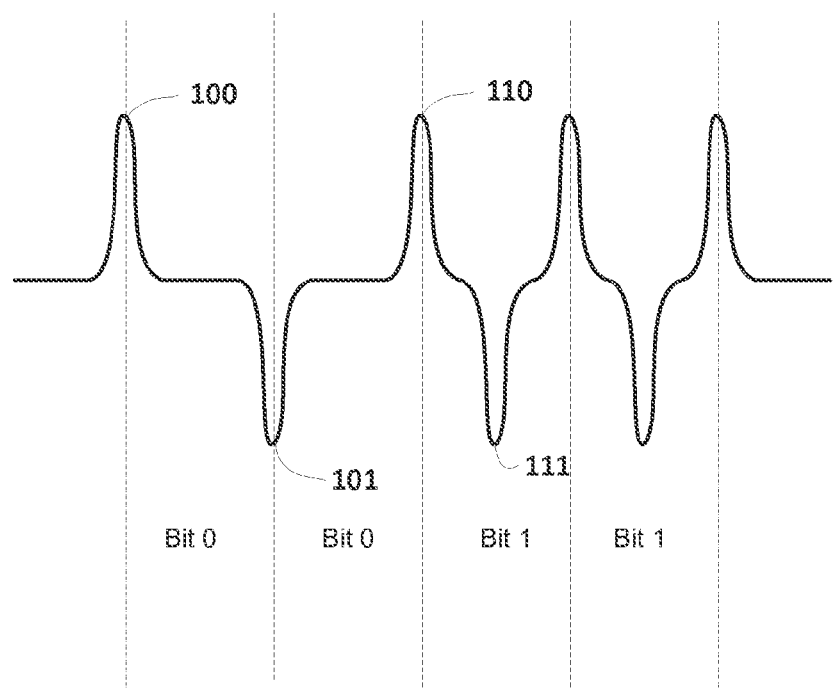
FIG. 3 shows a typical segment of the magnetic flux signal read by a magnetic read head of FIG. 2.

Binary track data are encoded on magnetic cards using a frequency/double frequency (F2F) encoding scheme where bit 1 and bit 0 are represented by encoded signals with different spacing. When a magnetic stripe is swiped through a groove of magnetic card reader, the generated magnetic flux is picked up by the magnetic read head and the encoded track data are retrieved from the magnetic stripe. FIG. 3 shows the analog signal output from a magnetic read head front end. The separation distance between peaks 100 and 101 is half of the separation distance between peaks 110 and 111. The signal pulses 100 and 101 correspond to two bit 0s. Pulses 110 and 111 are at double frequency and correspond to a bit 1.

Figure 4:
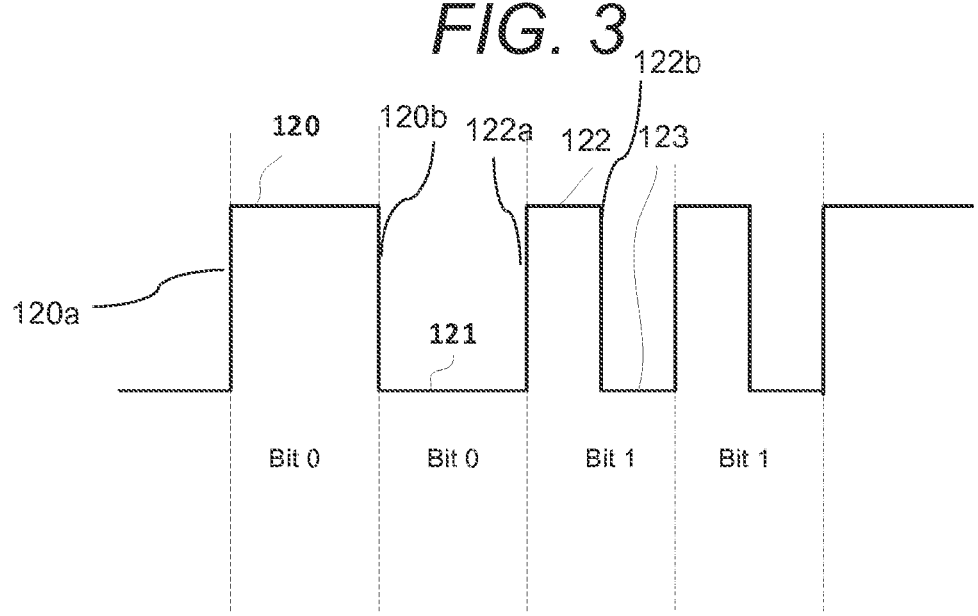
FIG. 4 shows a typical segment of the magnetic flux signal after passing through a rectification circuit.
Figure 6:
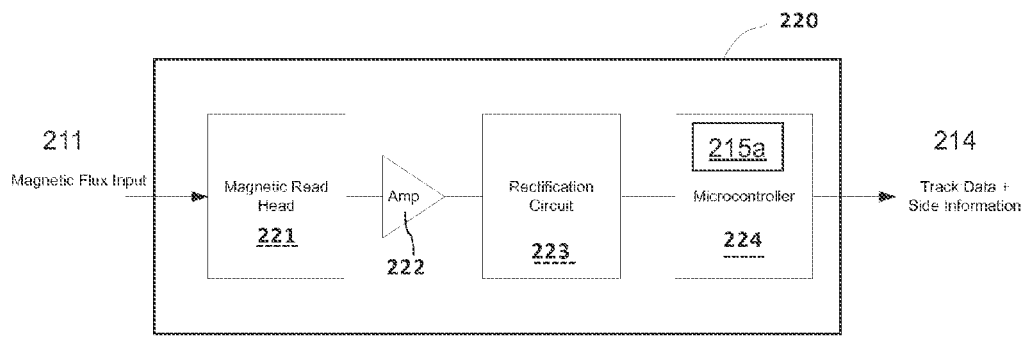
FIG. 6 shows a block diagram of one possible embodiment of a magnetic read head module including a rectification circuit.
Figure 7:
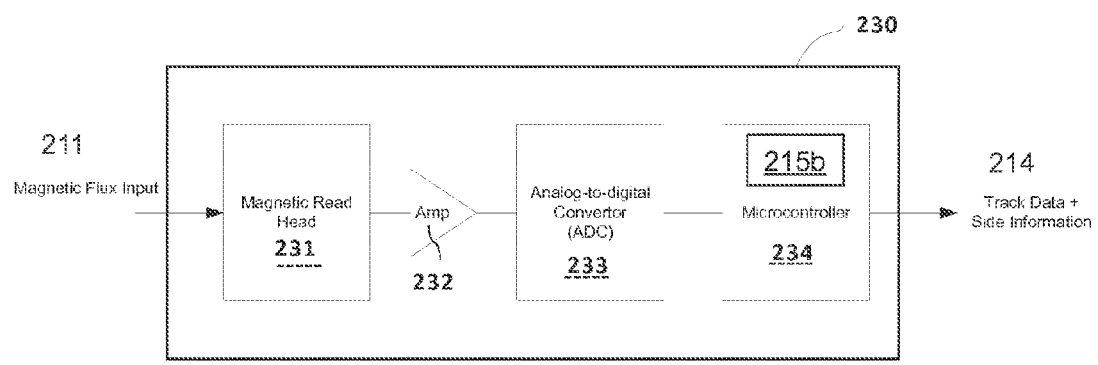
FIG. 7 shows a block diagram of one possible embodiment of a magnetic read head module including an analog-to-digital conversion circuit.

The present invention utilizes two different ways of decoding the input magnetic signal 211 signal with magnetic read head modules 220, 230, shown in FIG. 6 and FIG. 7, respectively. Referring to FIG. 6, magnetic read head module 220 includes a magnetic read head 221, an amplifier 222, a rectification circuit 223, a microcontroller 224 and an edge detection algorithm 215*a*. Input magnetic signal 220 is converted by the magnetic read head 221 into an electronic signal. The electronic signal is first amplified by the amplifier 222 and then passes through the rectification circuit 223. The analog electronic signal is then converted to a train of pulses 120, 121, 122, 123 (shown in FIG. 4) with the rectifier circuit 223 and the positions of the pulses are determined by the edge detection algorithm 215*a* that is implemented and executed by the microcontroller 224. The spacing between consecutive pulses is computed and interpreted to be either bit 1 or bit 0. FIG. 4 shows the train of pulses 120, 121, 122, 123 in the resulting waveform after rectification of the raw electronic signal. Pulses 120 and 121 are wide pulses corresponding to bit 0. Pulses 122 and 123 are narrow pulses and together they represent a bit 1. The spacings between rising edges 120*a*, 122*a* and/or falling edges 120*b*, 122*b* of the pulses 120, 121, 122, 123 are used as soft-decision parameters. In particular, edges that are spaced far apart indicate a swipe with fast speed and edges that are closely spaced indicate a swipe with slow speed. Edges are far apart when their spacing is comparable to or larger than their height. Edges are closely spaced when their spacing is smaller than their height.

Figure 5:
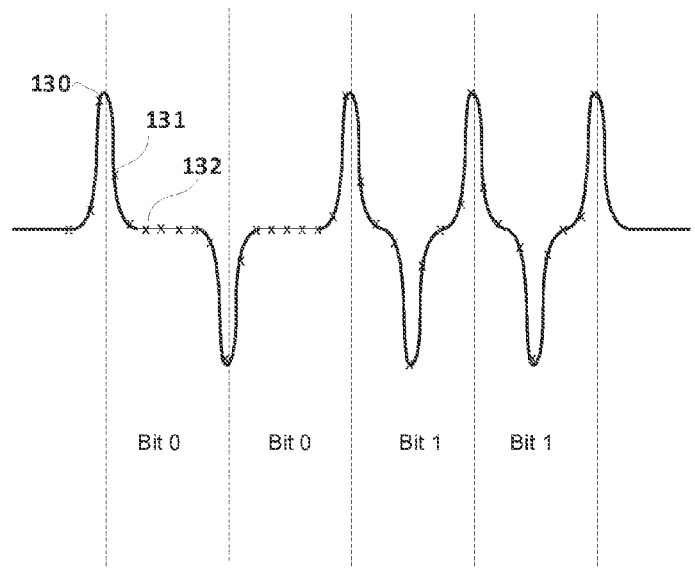
FIG. 5 shows a typical segment of the magnetic flux signal and its sampled values in an analog-to-digital conversion process.

Alternatively, instead of rectification, the amplified signal is sampled and converted to a digital signal through an analog-to-digital convertor (ADC) circuit. Referring to FIG. 7, magnetic read head module 230 includes a magnetic read head 231, an amplifier 232, an analog-to-digital convertor (ADC) circuit 233, a micro controller 234, and an algorithm 215*b*. The ADC circuit 233 samples the signal generated by the amplifier 232 and converts it to a digital signal, shown in FIG. 5. The positions of the peaks 130 in the digital signal are determined by the algorithm 215*b* that is implemented and executed by the microcontroller 234. The spacing between consecutive peaks is computed and interpreted to be either bit 1 or bit 0. These sampled data usually preserve more information than the rectified data and are more useful for analysis and diagnosis. Some microcontrollers can perform AD conversion in one or more of their input pins. Thus, the AD convertor may be part of the micro controller and not necessarily an external circuitry. FIG. 5 shows the resulting waveform after amplification of the raw signal. Sample points 130, 131 and 132 are converted to digital values for processing. For example, 130 is a local maximum value and can be interpreted as the position of the peak of the pulse. In either the edge detection data or the AD converted data, a set of soft-decision data is available before hard-decision. The soft-decision data is then used for hard decision to restore the original encoded bit stream. The track data are encoded with some simple mechanisms to determine if it is a good read or if there is an error. Each encoded character has a parity bit to ensure that each character is read correctly. The whole track has also a longitudinal parity bit to ensure that the whole track is read correctly. If there are one or more parity errors, the card read is bad and should be discarded.

In the present invention, card swipe information about the error cause is output as side information. In the edge detected soft decision data, the spacing between the edges is used to indicate the speed of the swipe. Widely spaced pulses indicate a fast swipe, whereas, closely spaced pulses indicate a slow swipe. In the AD converted soft decision data, the spacing between the peaks and the height of the peaks are used to indicate the speed of the swipe. A widely spaced signal indicates a fast swipe, whereas, a closely spaced signal indicates a slow swipe. A high peak also indicates a fast swipe, whereas, a low peak indicates a slow swipe. Side information about the speed of the swipe is fed back to the user of the card reader who can then improve the speed of further card read retries.

Figure 8A:
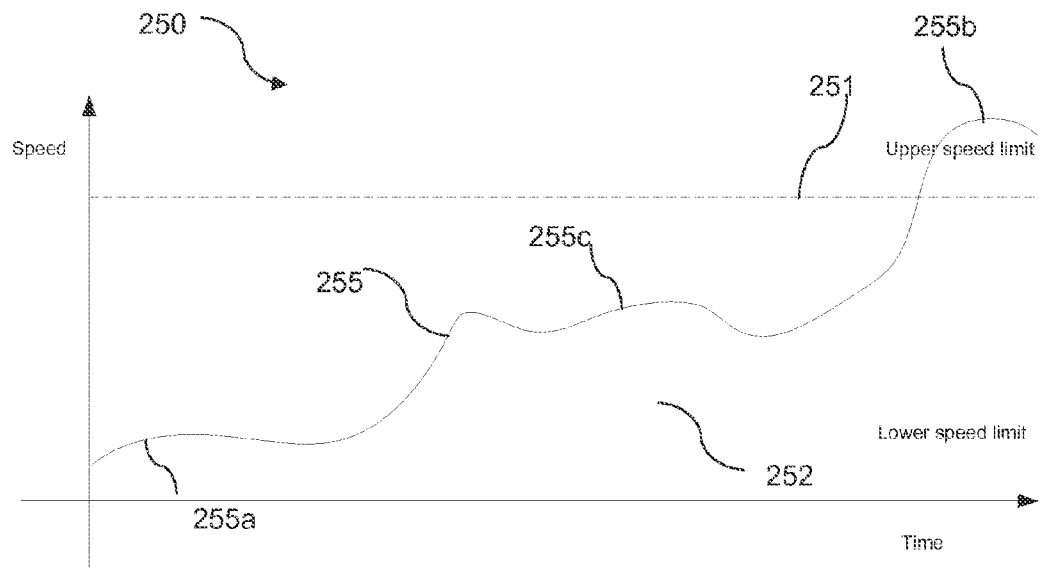
FIG. 8A shows a graph of swipe speed versus time indicating that the speed is too low at the beginning and is too high towards the end of the swipe.
Figure 8B:
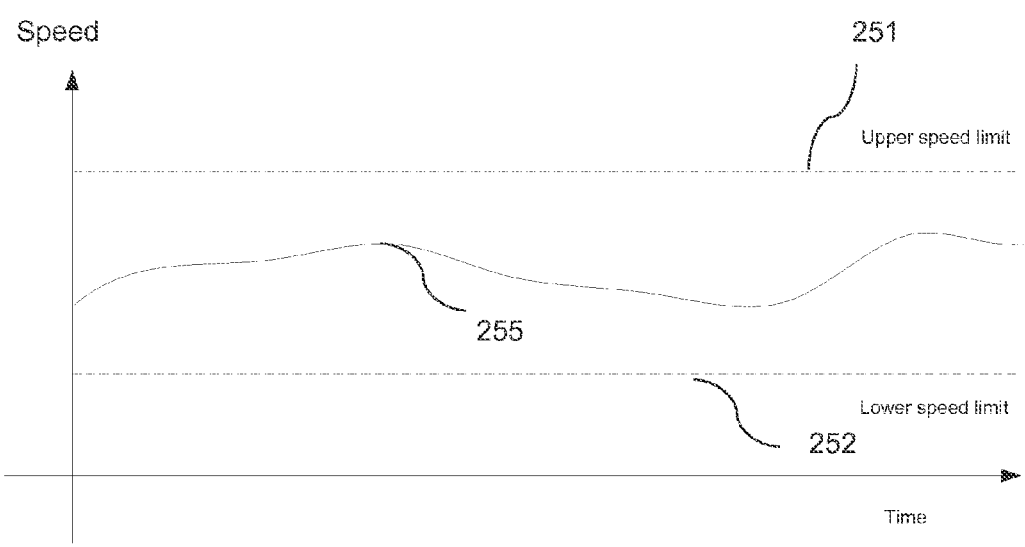
FIG. 8B shows a graph of swipe speed versus time indicating that the user readjusts his swipe behavior to fall within the speed limits

In one implementation, a graphical plot 250 of the speed profile of the card swipe is generated by the application and is displayed graphically, as shown in FIG. 8A and FIG. 8B. The speed plot 250 also includes the upper and lower speed limits 251, 251, respectively. Ideally, the speed graph 255, should be in the range between the upper and lower speed limits 251, 251, as shown in FIG. 8B. Furthermore, a uniform swiping speed is best for decoding. However, it is common that the speed near the start 255*a* or the end 255*b* of the swipe is very different from the speed in the middle 255*c* of the swipe. By looking at the speed profile 250 graphically, the user can learn to adjust the swipe speed so that it is uniform and in the range between the upper and lower speed limits 251, 252, respectively.

Furthermore, by analyzing the soft decision data, the position of the parity error bits is determined. The microcontroller outputs the error position which can then help the operator to pin-point the problem of a probably badly encoded or damaged card. A common problem is that the card is bent or angled at a bad position near the end of a swipe because the operator changes the pathway of the card too early. If the soft decision data contain many errors after a certain point, it strongly indicates that there is an operation error.

What is claimed is:

1. A magnetic card reader module comprising:
   a magnetic sensor and an adjacent groove, wherein the magnetic sensor picks up an analog magnetic signal generated by swiping a magnetic stripe through the groove, and wherein the magnetic stripe is attached to a card and comprises tracks with magnetically encoded data;
   a microcontroller to convert the analog magnetic signal into a digital signal; and
   an application to
      analyze the digital signal,
      decode the digital signal, and
      generate an output comprising the magnetically encoded data and card swipe information feedback.

2. A method for reading data encoded in a magnetic stripe comprising:

providing a magnetic card reader comprising a magnetic sensor and an adjacent groove, picking up, by the magnetic sensor, an analog magnetic signal generated by swiping a magnetic stripe through the groove, wherein the magnetic stripe is attached to a card and comprises tracks with magnetically encoded data;

converting, using a microcontroller, the analog magnetic signal into a digital signal;

analyzing, using the microcontroller, the digital signal;

decoding, using the microcontroller, the digital signal;

generating, using the microcontroller, an output comprising the magnetically encoded data and card swipe information feedback.

3. A method for reading data encoded in a magnetic stripe comprising:

providing a magnetic card reader comprising a magnetic sensor and an adjacent groove, picking up, by the magnetic sensor, an analog magnetic signal generated by swiping a magnetic stripe through the groove, wherein the magnetic stripe is attached to a card and comprises tracks with magnetically encoded data;

converting, using a microcontroller, the analog magnetic signal into a digital signal;

analyzing, using an application, the digital signal;

decoding, using the application, the digital signal;

generating, using the application, an output comprising the magnetically encoded data and card swipe information feedback.

* * * * *